United States Patent [19]

Bruneval

[11] Patent Number: 4,933,917

[45] Date of Patent: Jun. 12, 1990

[54] MEANS FOR MONITORING THE LAYING OF A DEEP SEA CABLE OR FLEXIBLE PIPELINE

[75] Inventor: Gilles Bruneval, Loon Plage, France

[73] Assignee: Societe Anonyme dite: Les Cables de Lyon, Clichy Cedex, France

[21] Appl. No.: 330,513

[22] Filed: Mar. 30, 1989

[30] Foreign Application Priority Data

Mar. 31, 1988 [FR] France .................. 88 04303

[51] Int. Cl.$^5$ .................. G01S 3/80
[52] U.S. Cl. .................. 367/130; 367/13; 367/134; 405/158
[58] Field of Search .................. 367/134, 130, 13; 405/158, 160, 166, 168, 171

[56] References Cited

U.S. PATENT DOCUMENTS

| | | | |
|---|---|---|---|
| 3,214,921 | 11/1965 | Goepfert et al. .................. | 367/106 |
| 4,003,210 | 1/1977 | Bostroem .................. | 405/171 |
| 4,048,686 | 9/1977 | Ege .................. | 405/171 |
| 4,283,681 | 8/1981 | Kazuomi et al. .................. | 367/106 |

*Primary Examiner*—Thomas H. Tarcza
*Assistant Examiner*—Daniel T. Pihulic
*Attorney, Agent, or Firm*—Sughrue, Mion, Zinn, Macpeak & Seas

[57] ABSTRACT

Apparatus for monitoring the laying of a deep sea cable or flexible pipeline (1) from a vessel (22). The apparatus comprises a sleeve threaded on the cable or flexible pipeline and having sliding means (4) tangential to said cable or pipeline and measuring means (3A) for measuring variables indicative of the position of the sleeve and for transmitting their values, positive buoyancy means (8) mechanically connected to the sleeve, an auxiliary small chain (19) suspended from the sleeve and extending down to the sea bed, the mass per unit length of the chain, and the masses and volumes of the sleeve and of the positive buoyancy means being such that the sleeve is maintained around that part of the cable which is situated at a substantially constant height above the sea bed (21), which height is relatively small compared with the depth of the sea bed.

8 Claims, 2 Drawing Sheets

MEANS FOR MONITORING THE LAYING OF A DEEP SEA CABLE OR FLEXIBLE PIPELINE

The present invention relates to means for monitoring the laying of a deep sea cable or flexible pipeline, particularly an electrical power transmission cable or a pipeline for conveying petroleum or natural gas.

When an underwater cable is being laid, excessive tension can occur which may damage or even break the cable. Conversely, if the tension becomes too slack, the cable can form a loop close to the sea bed. The laying operation can be monitored by checking the cable tension from the cable laying vessel or the angle at which the cable enters the water. However, the tension which is measured at the vessel depends primarily on the weight of the length of cable suspended from the vessel. It depends very little on the tension of the cable at the sea bed. Similarly, measuring the immersion angle only provides a useful indication for relatively shallow depths, of a few hundreds of meters.

Unfortunately, underwater cables are currently being laid at depths of several thousand meters where neither the cable tension at the vessel nor its immersion angle give a valid indication of the cable tension on the sea bed. This problem is particularly serious in the case of power transmission cables where it is essential for the cable lying on the sea bed to be subjected to a certain tension, in contrast with telecommunications cables which are usually laid with some slack.

U.S. Pat. No. 4,037,189 describes an apparatus for measuring the profile of a flexible underwater pipeline while it is being laid, said apparatus comprising three non-collinear acoustic signal transmitters, located either on the pipe laying vessel or on the pipeline, and acoustic receivers spaced apart along the pipeline, said apparatus determining the various spacings between the acoustic transmitters and receivers. However, such an apparatus is complex and expensive.

U.S. Pat. No. 4,388,710 describes an apparatus for measuring the tension of an underwater cable as it is being laid, said apparatus comprising acoustic transmitters located near the sea bed, acoustic transmitters arranged along the cable as it is laid and connecting to tension measuring gauges, and acoustic receivers located on an auxiliary vessel. Such an apparatus is likewise complex and expensive.

The object of the present invention is to provide a simple and inexpensive apparatus for monitoring the laying of a deep sea cable or flexible pipeline, said apparatus enabling the profile of the cable between the vessel and the sea bed to be observed precisely and allowing any potentially cable-damaging change in laying conditions to be detected.

The apparatus of the invention is characterized in that it comprises a sleeve threaded on the cable or flexible pipeline, said sleeve having sliding means tangential to said cable or pipeline and measuring means for measuring variables indicative of the position of the sleeve and for transmitting their values, positive buoyancy means mechanically connected to the sleeve, an auxiliary small chain suspended from the sleeve and extending down to the sea bed, the mass per unit length of the chain and the masses and volumes of the sleeve and of the positive buoyancy means being such that the sleeve is maintained around that part of the cable which is situated at a substantially constant height above the sea bed, said height being relatively small compared with the depth of the sea bed.

Of course the total length of the small chain must exceed said height. The choice of the height above the sea bed determines the angle which the sleeve makes with the vertical. If that angle is small, it will not vary significantly with the tension applied to the cable. If the angle is large, that is, if the height is very small, variations in tension will give rise to greater variations in the angle but the sleeve will run less easily along the cable. Experiment has shown that a value of about 45° is a good compromise.

Preferably the apparatus also includes at least one of the following features:

the measuring means responds to at least one of the following variables: inclination of the sleeve with respect to the vertical; depth; and horizontal distance from the vessel from which the cable or flexible pipeline enters the sea;

the positive buoyancy means are constituted by a set of hollow spheres which are secured to one another;

the positive buoyancy means are constituted by a plastic foam which withstands the pressure at the depth at which it is immersed; and the mass per unit length of the small chain and the masses and volumes of the sleeve and of the positive buoyancy means, relative to the tension exerted on the cable or flexible pipeline by the laying operation, are such that the angle of the sleeve with respect to the vertical is about 45° as indicated above.

Apparatus according to the invention for monitoring the laying of an underwater power cable is described by way of example and with reference to the following drawings.

Figure 1:
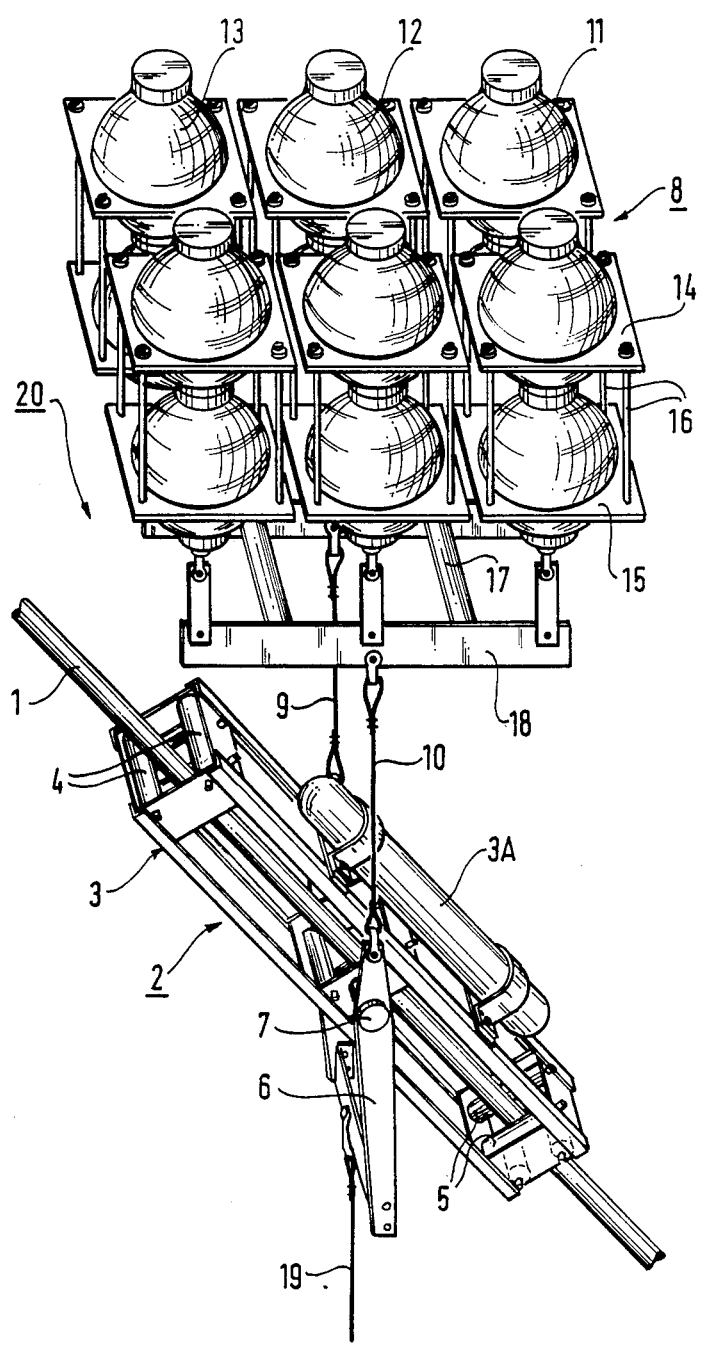
FIG. 1 is a large scale view of the monitoring apparatus as associated with the cable at a relatively small distance from the sea bed.

FIG. 1 shows the monitoring sleeve 2 which is slidably mounted on the cable 1. It comprises a sleeve in the shape of a rectangular parallelepiped frame 3 having, at its upper and lower ends and at its center, rollers 5 which facilitate sliding of the sleeve along the cable. A measuring device 3A associated with an acoustic transmitter is secured on the frame. In particular, the device measures the angle which the cable makes with the vertical at the depth at which the device is situated, the ambient pressure and hence that depth, and the distance to the vessel by receiving an acoustic beam emitted from the vessel. This data is transmitted by an acoustic transmitter which communicates with a receiver on board the cable-laying vessel. A yoke 6 can pivot relative to the frame around bearings such as 7 defining articulation means. A raft 8 is linked to the yoke 6 by metal wires 9 and 10. The raft consists of thick glass spheres such as 11, 12, and 13, which are retained in plates 14 and 15 interconnected by braces 16. The sphere assembly is held in a fixed position by a set of perpendicular beams 17 and 18.

Additionally, a small chain 19 secured to the cross-member of the yoke 6 extends right down to the sea bed on which a certain length of chain rests.

The sleeve takes up a position along the cable such that the upward pressure exerted by the water on the apparatus as a whole balances the weight of the apparatus and of the suspended portion of the chain down to the sea bed.

The volume of the spheres in the raft and the weight per meter of the small chain are determined so that the sleeve is maintained just above the sea bed, for example at about 100 meters above it, with the length of the small chain obviously being greater than 100 meters.

If necessary, the raft of spheres could be replaced by a raft of polymer resin foam incorporating beads to ensure that it withstands ambient pressure.

Figure 2:
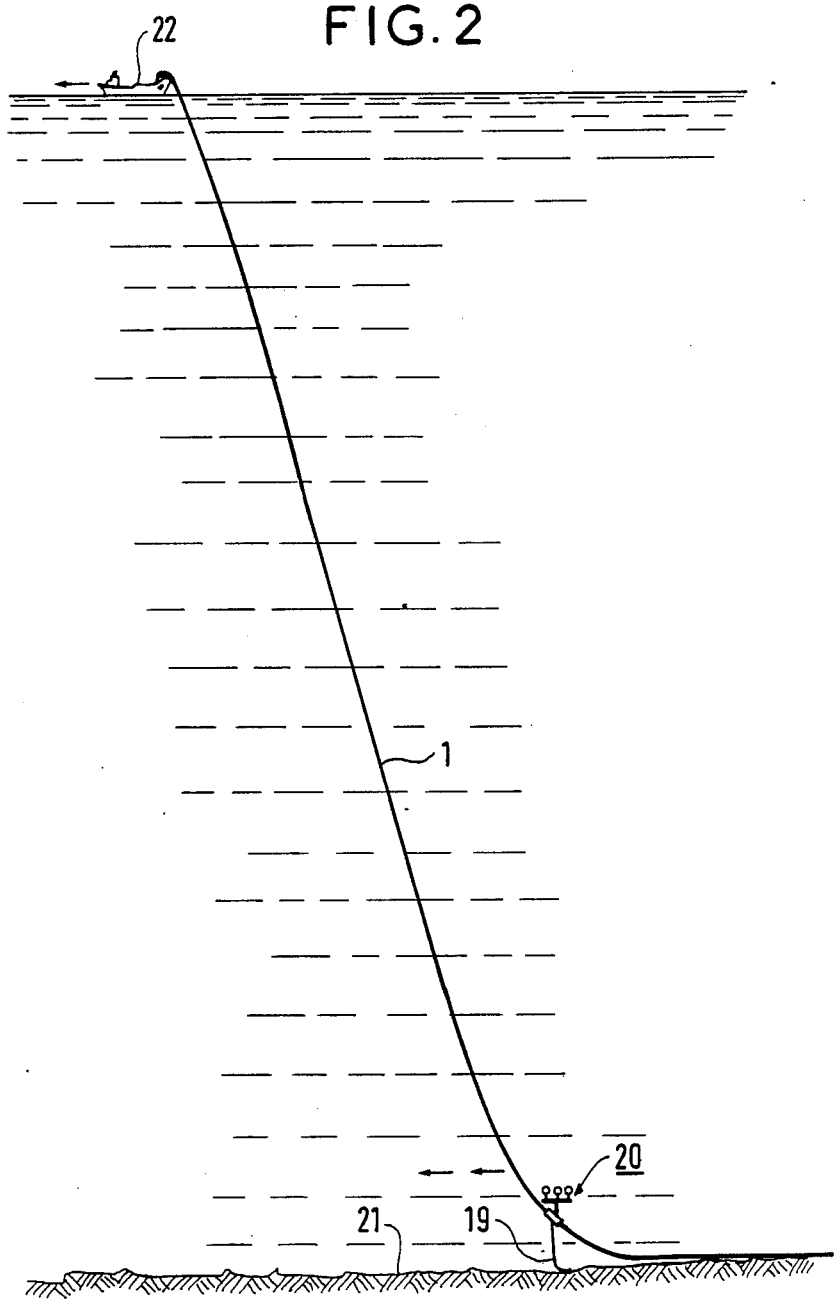
FIG. 2 shows the entire cable as it is being laid from the vessel.

In FIG. 2, reference 20 designates an overall schematic view of the monitoring apparatus. The apparatus is located on the cable 1 at a small distance, for example about a hundred meters, above the sea bed 21.

Cable 1 leaves the surface vessel 22, and in known manner assumes an approximate catenary curve. The arrow adjacent reference 20 indicates the direction in which the laying advances.

It will be understood that if an obstacle on the sea bed or the formation of a loop on the cable near the sea bed causes the tension in the cable to increase, the angle which the sleeve makes with the vertical will be increased. This variation in angle is transmitted to the surface vessel and enables such an incident to be detected and corrected before the cable is damaged.

I claim:

1. Apparatus for monitoring the laying of a deep sea cable or flexible pipeline (1) form a surface vessel (22) onto a deep sea bed, characterized in that said apparatus comprises a sleeve (2) threaded on the cable or flexible pipeline, said sleeve having sliding means (4) free of connection to said vessel, tangential to said cable or pipeline and measuring means (3A) for measuring variables indicative of the position of the sleeve and for transmitting their values, positive buoyancy means (8) mechanically connected to said sleeve, an auxiliary small chain (19) suspended from said sleeve and extending down to the sea bed, the mass per unit length of the chain, and the masses and volumes of the sleeve and of the positive buoyancy means being such that a lower end of said chain contacts the sea bed and maintains the sleeve around a part of the cable situated at a substantially constant, relatively small height above the sea bed (21), compared with the depth of the sea bed.

2. Apparatus according to claim 1, characterized in that the measuring means (3A) responds to at least one of the following variables: inclination of said sleeve with respect to the vertical; depth; and horizontal distance from the vessel from which the cable or flexible pipeline enters the sea.

3. Apparatus according to claim 1 or 2, characterized in that the positive buoyancy means (8) are constituted by a set of hollow spheres (11, 12, 13) which are secured to one another.

4. Apparatus according to claim 1 or 2, characterized in that the positive buoyancy means are constituted by a plastic foam which withstands the pressure at the depth at which is immersed.

5. Apparatus according to claim 1 or 2, characterized in that the mass per unit length of the small chain and the masses and volumes of the sleeve (2) and of the positive buoyancy means (8), relative to the tension exerted on the cable or pipeline by the laying operation, are such that the angle of said sleeve with respect to the vertical axis is maintained at 45°.

6. Apparatus according to claim 1, wherein said cable or pipeline by the laying operation are such that the angle of the sleeve with respect to the vertical is maintained about 45°.

7. Apparatus according to claim 1, wherein said sleeve comprises a frame, a yoke pivots relative to the frame, said positive buoyancy means (8) is coupled to said yoke to one side of the pivot connection to said frame, and said auxiliary small chain is suspended from said yoke to the side opposite the pivot from the connection to said positive buoyancy means, whereby the sleeve takes a position along the cable such that the upward pressure exerted by the water on the apparatus as a whole balances the weight of the apparatus and of the suspended portion of the chain down to the sea bed.

8. Apparatus according to claim 1, wherein articulating means mechanically connects said positive buoyancy means to said sleeve and said small chain (19) to said sleeve such that said sleeve pivots in response to cable angle variance with said sleeve maintained at said substantially constant height above the sea bed (21).

* * * * *